United States Patent [19]
Yates

[11] 3,944,243
[45] Mar. 16, 1976

[54] SHOW BUGGY

[76] Inventor: Patrick D. Yates, 23668 Avenue 17, Madera, Calif. 93637

[22] Filed: Oct. 23, 1973

[21] Appl. No.: 408,845

[52] U.S. Cl. ............................ 280/63; 280/506
[51] Int. Cl.² .................................... B62C 1/00
[58] Field of Search .......... 280/63, 506, 186, 476 R, 280/511; 403/132, 133

[56] References Cited
UNITED STATES PATENTS

| 317,066 | 5/1885 | Wood | 280/63 |
| 649,204 | 5/1900 | Harfield | 280/186 |
| 3,058,765 | 10/1962 | Thomas | 403/133 |

*Primary Examiner*—Robert R. Song
*Attorney, Agent, or Firm*—Vergil L. Gerard

[57] ABSTRACT

Disclosed is a buggy shaft for a four wheel show buggy which attaches the buggy to the horse by means of a ball joint rather than a clevis hinge. The shaft is formed of steel tubing through its main portion and has a cast aluminum distal end. The ball joint is resiliently loaded and the shafts are filled with plastic material to avoid noise generation and transmission. A harness cleat is mounted on the cast aluminum end for securing the harness to the shafts and a tug guide is provided on the main portion of the shaft to keep the tug lines in proper position. In a modified form the buggy is connected to the horse by a center shaft which mounts to the harness collar by a ball joint and is similarly mounted to the buggy. In this form the shaft is formed entirely of steel tubing.

7 Claims, 15 Drawing Figures

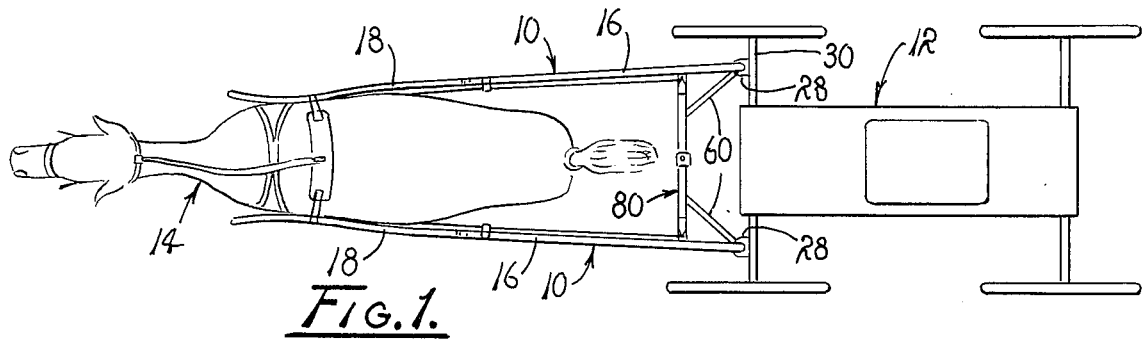
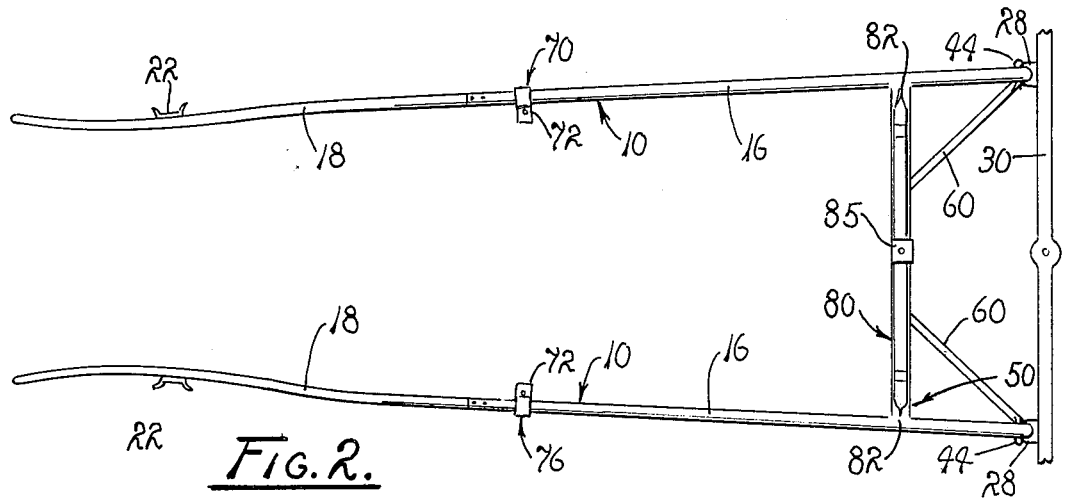
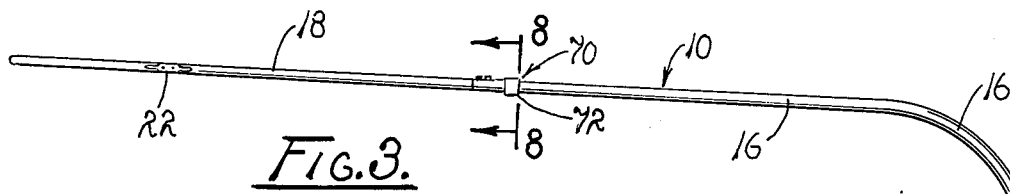
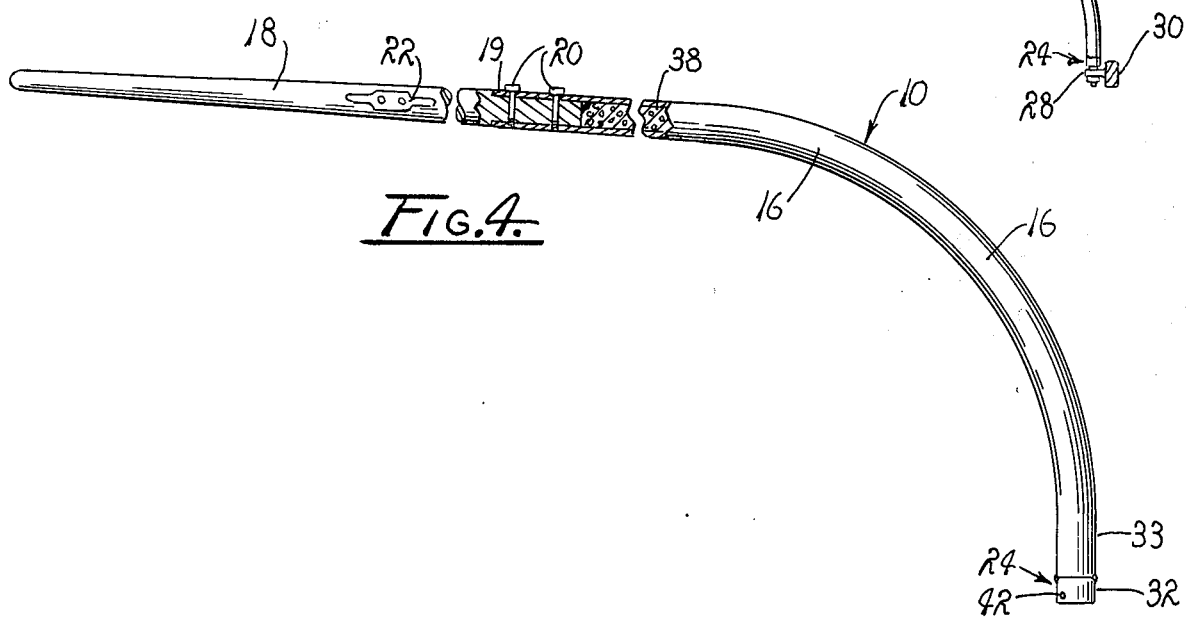

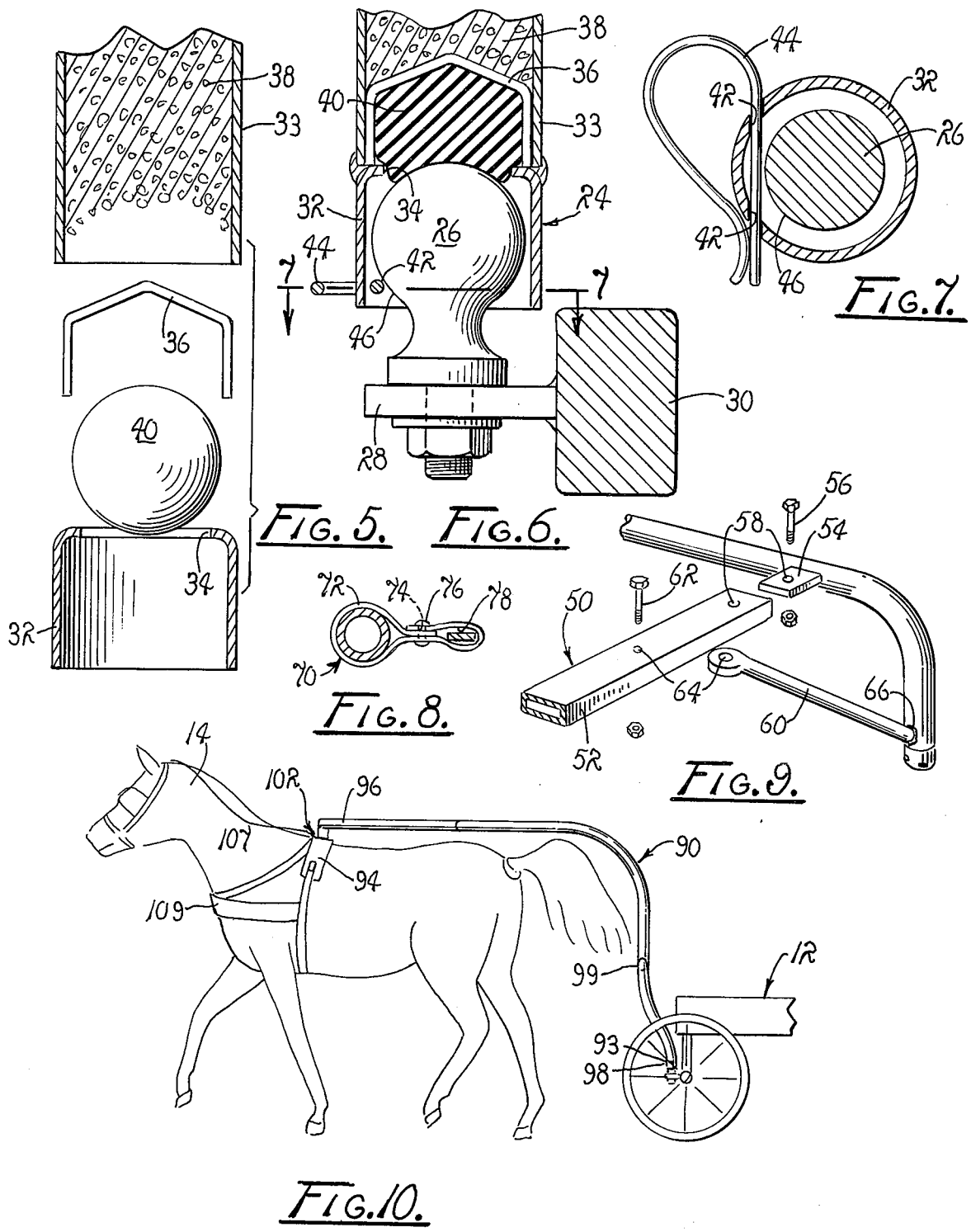

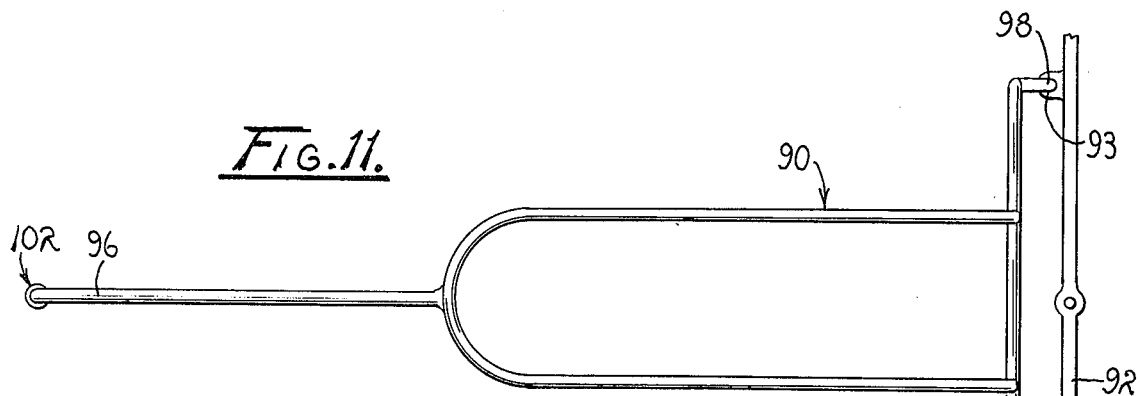
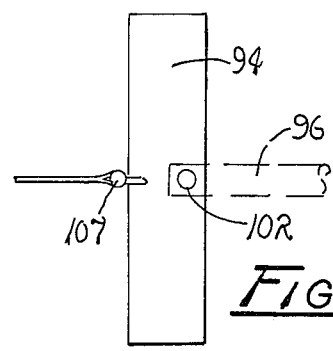
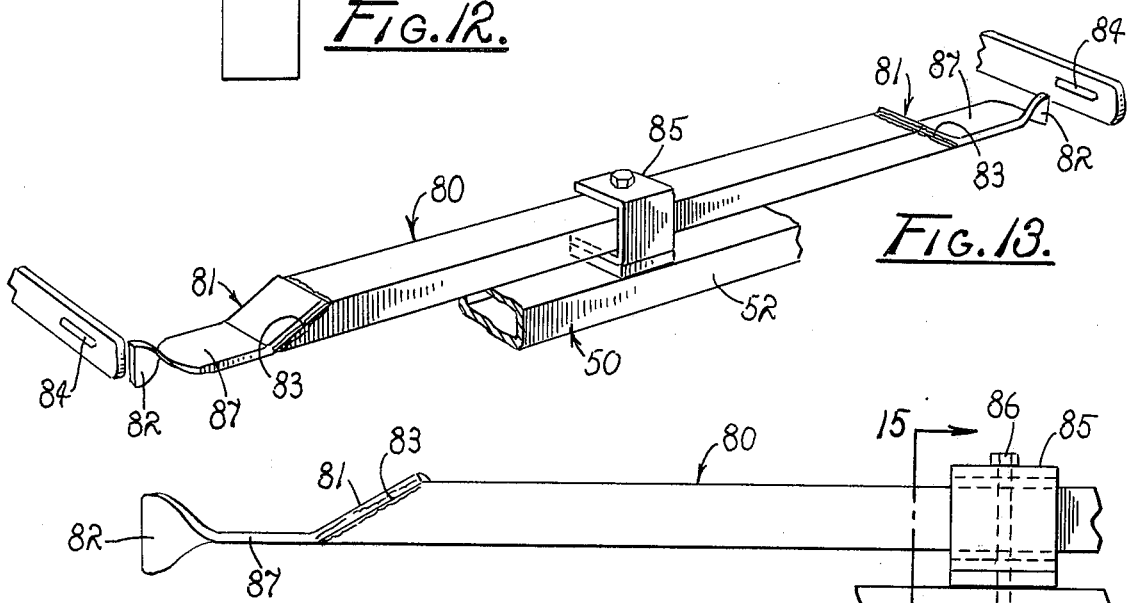
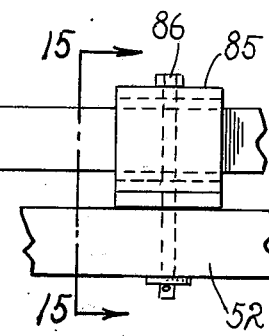
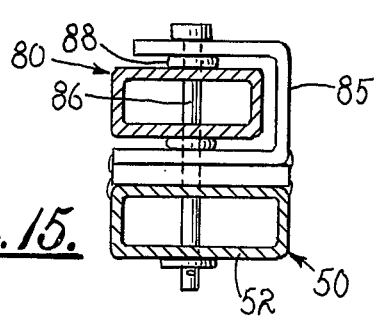

SHOW BUGGY

BACKGROUND OF INVENTION

This invention relates generally to buggy shaves for single passenger four wheel show buggies.

The showing of horses under harness in fancy buggy competition has grown in popularity in recent years. The horses used in this competition are often carefully bred, expensive stock and the buggies rival each other in fancy appearance and are expensive to build. The shaves which attach the buggy to the horse have been made of laminated hickory wood and are attached to the front axle of the buggy in a manner which permits the shaves to pivot vertically with respect to the buggy axle but not horizontally.

In training horses to the harness for fancy buggies and in the shows themselves, it is not unusual for a horse to lose its footing under harness. On occasion this has resulted in the shaves breaking or the buggy being turned over. When shaves of laminated hickory break they leave very jagged edges which can badly wound a horse. If the buggy turns over its destruction or virtual destruction usually results.

Metal shaves can be made stronger than those of laminated hickory, but this does not resolve the problem of the buggy being turned over with possible destruction and injury to the horse. Also, metal shaves previously used have been found to generate and transmit noise which irritates the horse and takes away from the show effect. A need, therefore, exists for metal buggy shaves which will not break nor cause the buggy to turn over, and yet will avoid noise generation and transmission.

OBJECTS OF INVENTION

It is, therefore, a major object of my invention to provide a metal buggy shaft for fancy show buggies.

It is also an important object of my invention to provide a joint for interconnecting the shaft between the buggy and the horse, which permits universal movement of the shaft with respect to its point of connection, so that buggy turnovers are avoided.

It is also an object of my invention to provide a buggy shaft of the type described in which the ball connector and shaft are sound proofed to prevent rattling and other distracting noises.

A further object of my invention is to provide a buggy shaft of the type described which has a harness cleat affixed to the distal end of the shaft for convenient attachment to the harness.

It is yet another object of my invention to provide a buggy shaft of the type described which utilizes a simple clamp loop for guiding the harness tugs along the inside of the shaft.

It is still a further object of my invention to provide a buggy shaft of the type described which has a pleasing appearance and yet is strong, durable and easy to manufacture.

These and other objects and advantages of my invention will become more readily apparent from the following detailed description of preferred embodiments and the accompanying drawings in which:

DRAWINGS

FIG. 1 is a plan view of a show buggy utilizing a first preferred embodiment of my shaft.

FIG. 2 is an enlarged plan view of the shaves shown in FIG. 1.

FIG. 3 is a side elevational view of one of the shaves shown in FIG. 2.

FIG. 4 is an enlarged sectional side elevational view of one of my shaves.

FIG. 5 is an enlarged exploded view of the ball joint used with my shaves.

FIG. 6 is a cross-sectional view of the ball joint connecting my shaves to the buggy or harness.

FIG. 7 is a sectional view taken on 7—7 in FIG. 6.

FIG. 8 is a sectional view taken on 8—8 in FIG. 3.

FIG. 9 is an exploded view of the cross brace structure which holds my shaves together.

FIG. 10 is a side elevational view of a second preferred embodiment of my invention.

FIG. 11 is an enlarged plan view of the shaft in my second embodiment;

FIG. 12 is a partial plan view showing attachment of the shaft in my second embodiment to the harness of a draft animal;

FIG. 13 is a perspective view of the whiffle tree of my first embodiment showing its pivotal mounting on the cross-brace member;

FIG. 14 is a partial elevational view of my whiffle tree shown in FIG. 13; and

FIG. 15 is a sectional view taken at 15—15 on FIG. 14.

DETAILED DESCRIPTION OF PARTS

Referring now to the drawings, and particularly to FIGS. 1–4 thereof, a pair of shaves 10 constructed in accordance with my preferred embodiment are shown attached to a show buggy 12 and astraddle a horse 14.

The shaves 10 have a main portion 16 formed of hollow cold rolled steel tubing and an end portion 18 formed of cast aluminum (see FIG. 4). The end portion 18 fits telescopically into the outer end 19 of the main portion 16 and is held in this assembled condition by two screws 20. The end portion 18 has a harness cleat 22 secured to it by attachement screws. The cleat 22 could also be attached by welding or formed as part of the casting of the end portion 18.

The shaves 10 are attached to the buggy 12 by means of a ball joint 24 (see FIGS. 5–7). The ball joint 24 includes a ball 26 mounted in an upright position on a bar 28 which is welded to the front axle 30 of the buggy and projects horizontally forward therefrom.

A socket 32 for receiving the ball 28 is formed in the proximal end 33 of each of the shaves 10 by welding the socket structure to the end of each shaft. The socket 32 has an opening 34 in the top. A U-shaped keeper 36 is inserted into the bore of each of the shaves above the socket 32 and welded in place before the socket is attached. After the keeper 36 has been welded into the bore of each shaft, a styrofoam nozzle is inserted into the shaft bore on one side of the keeper. By this means styrofoam 38 is blown in and fills the hollow main portion 16 of the shaft. This deadens the generation and transmission of noise in the shaves.

To keep the ball 28 from rattling in the socket 32 I grease and insert a small rubber ball 40 through the opening 34 in the top of the socket, where it is snuggly trapped between the keeper 36 and the top of the socket. A portion of the rubber ball 40 projects down through the opening 34 in the top of the socket and engages the upper portion of the steel ball 28 when it is inserted into the socket 32. This provides a resilient cushion between the upper portion of the steel ball 26 and the socket. To hold the steel ball in the socket against the resilience of the rubber ball, slots 42 are provided on the skirt of the socket and a clip pin 44 is inserted through the slots. The clip pin 44 projects into the socket 32 adjacent the location of the steel ball neck 46 when the ball is pressed against the rubber. The clip pins can be quickly removed to disengage the ball and socket and thereby disconnect the shaves 10 from the buggy 12. The clip pins 44 are disposed on the outside of the shaves to avoid conflict with the buggy axle 30.

To hold the shaves 10 together and provide a mounting for the harness tree, a cross-brace 50 is provided (see FIG. 9). The cross-brace 50 is a tubular rectangular bar 52 which extends between the shaves to the rear of the horse and just forward of their downward curvature. To attach the cross-brace 50 to the shaves, a cross-brace ear 54 is welded to each of the shaves and projects inwardly. The ears 54 fit into the bore of the tubular bar 52 at each end, and are held in place by inserting a bolt and nut 56 into holes 58. Further strength is added to the cross-brace 50 by tie rods 60 which extend diagonally between the cross-bar 52 and the downwardly directed portion of the shaves. The tie rods 60 are attached to the bar 52 by bolts and nuts 62 and aligned holes 64 and to the shaves 10 by welds 66.

In FIG. 8 I show the harness guides used with my shaves. The harness guides 70 consist of a strap 72 with aligned holes 74 and an attachment bolt 76. The holes 74 are so arranged that when the strap is looped around one of the shaves, looped back to form a harness passage 78 and then secured by passing the attachment bolt 76 through the holes 74, the loop around the shaves will grip them tightly and the harness passage 78 will freely pass the tug lines of the harness.

A tree 80 is pivotally mounted on the top of the bar 52 of the cross-brace 50 and extends laterally on either side of the mounting. The tree 80 has a flat configuration at each end 81 and is horizontally disposed, however, at its distal ends 82 the flat end surface is twisted to vertical disposition. Since harness tugs are flat also but are vertically disposed and have horizontally directed slots 84 in their distal ends, the distal ends are attached to the distal ends 82 of the tree 80 by pivoting the tug distal ends in a vertical plane until the slots 84 are aligned with the distal ends 82 of the tree, slipping the tug ends onto the tree until they pass the twist and the tug slots then pivot back into a horizontal disposition in alignment with the main body of the tree. The tugs are detached from the tree by reversing the above procedure. Thus, I have provided a simplified means for attaching tub ends to the distal end of a tree, which involves no bolts, stay pins or other movable devices.

The tree 80 is pivotally mounted to the cross-brace 50 by means of a U-bracket 85 and pivot pin 86. At its center the tree 80 is tubular with a taper cut 83 at each end. Flat bars 87 are welded to the taper cuts and extend horizontally outward therefrom to form the flat ends 81. The taper cuts 83 prevent inward movement of the tugs. Rubber spacers 88 are provided between the tree and the U-bracket to eliminate noise.

OPERATION

Having described the parts of my improved show buggy, I will now describe their use. The shaves are attached to the buggy by setting the sockets 32 on the proximal ends of each of the shaves over the steel balls 26 mounted on the axle, and pressing down on the shaves to compress the rubber ball 40 until the steel ball is into the socket far enough to permit the clip pin 44 to pass through the slots 42 in the skirt of the socket and adjacent the neck 46 of the steel ball. With the clip pins 44 thus inserted the shaves are locked to the steel balls and when each of the shaves is thus attached to the buggy, the buggy is ready for harnessing to the horse.

Since show buggies are frequently transported on the top of cars, trucks or trailers following the show circuit, easy detachability and attachability of the shaves on the buggy is important.

The buggy is then drawn up on a harnessed horse and the shaves placed on each side of the horse. The harness is attached to the distal or forward ends of the shaves by wrapping tiedown straps around the cleats 22 and as the buggy is attached, the tugs on the harness are passed through the tug guides on each side of the horse and their ends attached to the tree 80 by pivoting the ends and passing them over the twisted portions at the distal ends 80 of the tree.

With the buggy thus connected with the horse, the shaves 10 will move freely to accommodate the position of the horse, even if the horse loses its footing and falls. The lateral twisting which would normally be transmitted through the shaves to the buggy when a horse falls is eliminated by the universal joint movement of the ball and socket joints 24, and the risk of breaking the shaves or turning over of the buggy is largely eliminated. Moreover, the shaves can be readily released from the buggy by the driver merely reaching down to the front axle and pulling out the clip pins 44.

SECOND EMBODIMENT

In FIGS. 10–12 I show a second preferred embodiment of my invention in which only one center mounted shaft interconnects the horse and buggy. In this form, the shaft 90 is contoured to connect to the buggy axle 92 at its proximal end 93 and pass up and over the hind quarters of the horse and forward to the uppermost center point on the harness collar 94 at its distal end 96. The shaft 90 is formed entirely of steel tubing but is filled with styrofoam in the same manner as in my first embodiment to eliminate noise. At its proximal end 93 the shaft 90 is connected to the buggy 92 by ball joints 98. The ball joints 98 have the same construction as the ball joints 24 in my first embodiment. A mounting bar 99 extends between the balls joints 98 to form the rear portion of the shaft 90.

The distal or foward end 96 of the shaft 90 is attached to the harness by means of a ball and socket joint 102. The ball and socket joint 102 is also constructed the same as joint 24 in my first embodiment except that the steel ball is secured to the uppermost center point on the harness collar 94 and projects upwardly therefrom. A check rein cleat 107 is moved just forward of the steel ball.

The harness has breast straps 109 which extend down from the harness collar to resist rearward movement from the drag of the buggy. Rein loops 111 are provided on the sides of the harness collar to carry the reins. In this second embodiment, the harness is so modified that tugs and a whiffle tree are not required, thus the sides of the horse are open to view.

OPERATION OF SECOND EMBODIMENT

My second embodiment is connected to the buggy by the ball joints 98 in a manner similar to my first embodiment. The shaft 90 is positioned over the horse's back and the ball and socket joint 102 assembled by pressing the steel ball into the socket against the resilient urging of the rubber ball and locking it by inserting a clip pin 44. The reins then are passed through the loops in the harness collar and the harness tiedowns are secured to the distal end of the shaft.

If the horse should lose its footing and fall, the universal action of the ball and socket joints 98 and 102 prevents twist on the shaves sufficient to break them or overturn the buggy. As in my first embodiment, the ball joints 98 have pull pins so the shaves can be readily disconnected from the buggy by the driver.

Since the shaft in my second embodiment does not interfer with a side view of the horse, it is especially advantageous in show competition.

From this description it will be understood that I have provided a show buggy capable of attaining the objects and providing the advantages heretofore attributed to it. Particularly, my buggy has shaves which can replace the laminated hickory shaves presently in predominant use and avoid the damage to animals occasioned by the breaking of the hickory shaves. My shaft has greater strength than the hickory shaft and by reason of its ball and socket mounting on the buggy, or on harness of the horse, it gives the horse greater freedom and prevents overturn of the buggy if the horse should fall. My shaves permit quick disconnection from the buggy by the driver and by reason of their styrofoam filling and rubber ball resilient mounting, eliminate the noise usually present in metal shaves. Furthermore, my convenient cross-bar for mounting the tree, my cleats for attaching the shaft to the harness and my tug guides and my improved attachment structure for connecting the tug ends to the tree, all combine to provide a safe, inexpensive, versatile and visually pleasing show buggy.

I claim:

1. An improved buggy comprising:
   a chassis;
   an axle connected to said chassis;
   a pair of wheels connected to said axle;
   elongated shaft means having a proximal end disposed for interconnection with said buggy chassis and a distal end disposed for interconnection with the harness on a draft animal; and
   connector means interconnected with one of said ends of said shaft means for connecting said shaft means to said harness and said buggy chassis, said connector means including at least one universal joint having a steel ball, a socket disposed to receive said steel ball, a top opening in said socket, resilient means projecting into said socket through said top opening and engageable by said ball when disposed in said socket to urge said ball out of said socket, and releasable lock means interconnected with said socket and disposed to hold said ball in said socket against said resilient urging.

2. An improved buggy as described in claim 1 in which:
   said resilient means of said universal joint includes a compartment formed above said socket, and a rubber spacer disposed in said compartment with a portion projecting into said socket through said top opening.

3. An improved buggy as described in claim 1, in which:
   said lock means of said universal joint includes a neck on said steel ball adjacent the base thereof, a skirt on said socket disposed to surround said ball neck when said ball is near its point of maximum insertion into said socket, and a removable key interconnected with said skirt and disposable adjacent said ball neck to lock said ball in said socket.

4. An improved buggy as described in claim 1, in which:
   said elongated shaft means includes a shaft frame disposed to interconnect at said proximal end with each side of said axle and disposed to interconnect at said distal end to the upper center point of said harness, said shaft frame being contoured to pass upward from said axle and forward centrally over the back of a draft animal; and
   said connector means includes a universal joint interconnected between said harness and the distal portion of said shaft frame.

5. An improved buggy as described in claim 1, in which:
   one of said universal joints interconnects the distal end of said shaft means to said harness.

6. An improved buggy as described in claim 1, in which:
   said shaft means includes a pair of elongated shaves disposed in spaced parallel and having proximal ends disposed adjacent the axle of said buggy and distal ends disposable on opposite sides of a draft animal; and
   said connector means includes proximal end connectors interconnected between the proximal ends of said shaves and the axle of said buggy, said proximal end connectors each comprising a ball and socket joint, and distal end connectors disposed to interconnect the distal ends of said shaves to the harness of a draft animal, said distal end connectors including cleats mounted on the distal ends of said shaves to engage harness members and tug guides mounted on the distal ends of said shaves and disposed to movably pass harness members.

7. An improved buggy as described in claim 6, in which:
   said shaves have their proximal ends formed of metal tubing filled with a sound deadening material and their distal ends formed of cast metal and interconnected with the proximal ends; and
   said cleats of said distal end connectors are cast in said distal ends.

* * * * *